United States Patent
Safai et al.

(10) Patent No.: US 10,656,074 B2
(45) Date of Patent: May 19, 2020

(54) BONDLINE SENSORS

(71) Applicant: The Boeing Company, Chicago, IL (US)

(72) Inventors: Morteza Safai, Newcastle, WA (US); Kimberly D. Meredith, Seattle, WA (US)

(73) Assignee: The Boeing Company, Chicago, IL (US)

( * ) Notice: Subject to any disclaimer, the term of this patent is extended or adjusted under 35 U.S.C. 154(b) by 291 days.

(21) Appl. No.: 15/585,096

(22) Filed: May 2, 2017

(65) Prior Publication Data

US 2018/0321134 A1    Nov. 8, 2018

(51) Int. Cl.
| | |
|---|---|
| B32B 41/00 | (2006.01) |
| G01N 19/04 | (2006.01) |
| G01N 25/72 | (2006.01) |
| G01M 5/00 | (2006.01) |

(52) U.S. Cl.
CPC .............. G01N 19/04 (2013.01); G01N 25/72 (2013.01); G01M 5/0016 (2013.01); G01N 2203/0092 (2013.01)

(58) Field of Classification Search
CPC .............. G01N 19/04; G01N 25/72; G01N 2203/0092; G01M 5/0016
USPC .............. 156/64, 350, 351, 378, 379
See application file for complete search history.

(56) References Cited

U.S. PATENT DOCUMENTS

| | | | |
|---|---|---|---|
| 7,842,432 B2 * | 11/2010 | Niu ........................ | H01B 1/04 |
| | | | 429/512 |
| 8,250,928 B2 | 8/2012 | Miller et al. | |
| 8,397,580 B2 | 3/2013 | Georgeson et al. | |
| 8,616,068 B2 | 12/2013 | Miller et al. | |
| 8,726,737 B2 | 5/2014 | Georgeson et al. | |
| 2011/0132523 A1 * | 6/2011 | Evens ..................... | B29C 73/10 |
| | | | 156/94 |
| 2016/0349171 A1 | 12/2016 | Hull et al. | |
| 2016/0367151 A1 * | 12/2016 | Le .......................... | A61B 5/01 |

OTHER PUBLICATIONS

Jan et al., "Liquid exfoliated graphene smart layer for structural health monitoring of composites," Journal of Intelligent Material Systems and Structures, Nov. 2016, 10 pages.
Rinaldi et al., "Graphene-Based Strain Sensor Array on Carbon Fiber Composite Laminate," IEEE Sensors Journal, vol. 15, No. 12, Dec. 2015, pp. 7295-7303.
Young, "MEMS graphene strain sensor," Graduate Theses and Dissertations, Paper 14736, 2015, 68 pages.

\* cited by examiner

Primary Examiner — Michael N Orlando
Assistant Examiner — Joshel Rivera
(74) Attorney, Agent, or Firm — Yee & Associates, P.C.

(57) ABSTRACT

A bondline characteristic determination system comprises a plurality of graphene sensors and a plurality of graphene lines. The plurality of graphene sensors is positioned within a bondline of a composite structure. The plurality of graphene sensors is formed of graphene doped with a noble gas. The plurality of graphene lines electrically connects the plurality of graphene sensors external to the composite structure.

25 Claims, 4 Drawing Sheets

BONDLINE SENSORS

BACKGROUND INFORMATION

1. Field

The present disclosure relates generally to bondline sensors and, in particular, to graphene sensors in a composite bondline. More particularly, the present disclosure relates to a method and apparatus for determining a strength or an integrity of a bondline of a composite structure.

2. Background

Currently, there are no methods to ensure accurate and reliable bond strength in composite manufacturing. Current heating technologies may lead to underheat or overheat conditions. The underheat or overheat conditions may lead to inconsistencies in a bondline of a composite structure. The inconsistencies may lead to undesirably high re-work and scrap rates.

Currently, in the manufacturing and re-work of composites, heat blankets with thermocouples and other external temperature measurement devices may be used to determine if composite structures reach desired cure temperatures. However, thermocouples are undesirably bulky. Thermocouples are made of bulk metallic materials and will behave as foreign materials if left within a structure.

Further, heat transfer through complex geometries is not completely understood. Temperature measurement and heating devices can be difficult to properly control to ensure accurate heating.

Using current heating and temperature measurement technology may lead to low composite bond strength due to inconsistencies at the bondline. Currently, composite bond strength is not quantifiable using conventional non-destructive techniques. The inconsistencies in the bondline may be difficult to detect visually or by using non-destructive testing. Further, the non-destructive testing of the bondline may be undesirably costly. Therefore, it would be desirable to have a method and apparatus that take into account at least some of the issues discussed above, as well as other possible issues.

SUMMARY

An illustrative embodiment of the present disclosure provides a method. A plurality of graphene sensors is positioned in a bondline of a composite structure. The plurality of graphene sensors is formed of graphene doped with a noble gas. The composite structure is cured. A strength of the bondline of the composite structure is determined using measurements from the plurality of graphene sensors. The measurements are taken during the curing of the composite structure.

Another illustrative embodiment of the present disclosure provides a method. Measurements are taken from a plurality of graphene sensors positioned in a bondline of a composite structure. The plurality of graphene sensors is formed of graphene doped with a noble gas. An integrity of the bondline of the composite structure is determined using the measurements from the plurality of graphene sensors. The measurements are taken at least one of during a curing of the composite structure.

A further illustrative embodiment of the present disclosure provides a bondline characteristic determination system. The bondline characteristic determination system comprises a plurality of graphene sensors and a plurality of graphene lines. The plurality of graphene sensors is positioned within a bondline of a composite structure. The plurality of graphene sensors is formed of graphene doped with a noble gas. The plurality of graphene lines electrically connects the plurality of graphene sensors external to the composite structure.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
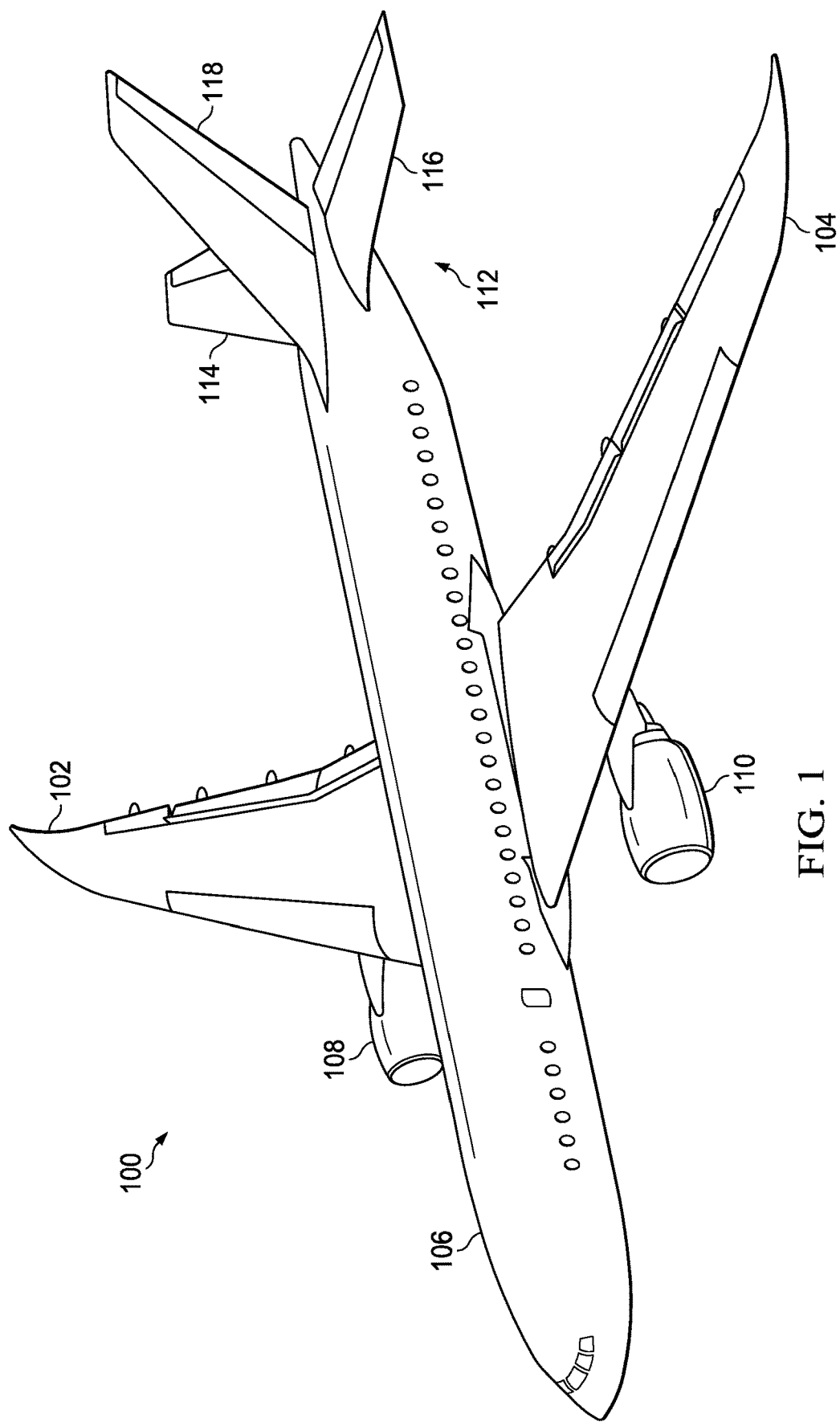
FIG. 1 is an illustration of an aircraft in which an illustrative embodiment may be implemented.

The illustrative embodiments recognize and take into account one or more different considerations. For example, the illustrative embodiments recognize and take into account that bondlines in composite structures may be formed using fasteners, co-curing composite portions, bonding the composite portions by curing a bonding adhesive, or by other desirable methods. The illustrative examples recognize and take into account that fasteners may be used as reinforcement for the bondlines of the composite structures. The illustrative examples recognize and take into account that the fasteners may be used as a failsafe for the composite structures having the bondlines. The illustrative examples recognize and take into account that the fasteners are used as a failsafe because conventional inspection techniques do not provide strength measurements of the bondline.

The illustrative examples recognize and take into account that the fasteners add to a weight of an aircraft. The illustrative examples thus recognize and take into account that removing the fasteners will reduce the weight of the aircraft and improve weight-dependent performance features of the aircraft.

The illustrative examples recognize and take into account that pressure and temperature during the curing of the bonding adhesive affects the strength of a resulting bondline.

The illustrative examples recognize and take into account that providing characteristic measurements for the bondline may allow for bondlines without failsafe fasteners. The illustrative examples recognize and take into account that characteristic measurements, such as the strength or integrity measurements may be desirably taken during the curing of the bonding adhesive.

The illustrative examples recognize and take into account that sensors in aircraft components desirably do not affect performance of the components. The illustrative examples recognize and take into account that sensors within the bondline would desirably be undetectable visually on an exterior of a composite structure.

The illustrative examples recognize and take into account that inconsistencies in the bondline are oftentimes undetectable until late in a manufacturing process because of limited feedback systems available to alert before, during, or after manufacturing or testing conditions occur that create the inconsistencies in the bondline of the composite structure. The illustrative examples recognize and take into account that continuing to perform manufacturing processes on the composite structures with the inconsistencies may result in an undesirable amount of waste. For example, the illustrative examples recognize and take into account that additional manufacturing material placed onto the composite structures with an undesirable amount of the inconsistencies may be material waste. As another example, the illustrative examples recognize and take into account that additional manufacturing processes performed on the composite structures with the undesirable amount of the inconsistencies may be a waste of manufacturing resources such as equipment time, manpower, or manufacturing floor space.

The illustrative examples recognize and take into account that graphene is a series of carbon atoms formed in hexagonal arrangements. The illustrative examples recognize and take into account that graphene can be formed in a very thinly layered, nearly transparent sheet, one atom thick. The illustrative examples recognize and take into account that from this attribute of graphene, a very thin sensor, such as a Wheatstone-type bridge resistor sensor that is only few atomic layers thin can be formed.

The illustrative examples recognize and take into account that graphene is remarkably strong and very low weight (about 100 times stronger than steel) and it conducts heat and electricity with great efficiency. The illustrative examples recognize and take into account that graphene can be formed into electrical conductors which will dissipate into structure at the end of curing process. The illustrative examples recognize and take into account that properties of graphene change with temperature. The illustrative examples recognize and take into account that the graphene can be used as an effective temperature sensor by monitoring a change in resistance with the temperature. The illustrative examples recognize and take into account that graphene sensors can be used in many configurations. For instance, the illustrative examples recognize and take into account that the graphene can be used in a continuous loop detection system configuration or as bridge resistor type sensor.

With reference now to the figures and, in particular, with reference to FIG. 1, an illustration of an aircraft is depicted in accordance with an illustrative embodiment. In this illustrative example, aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft in which bondline sensors may be implemented in accordance with an illustrative embodiment. For example, the bondline sensors may be implemented in a composite structure of aircraft 100 to determine characteristics of a bondline of the composite structure. Composite structures may be present in at least one of body 106, wing 102, or wing 104 of aircraft 100.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C or item B and item C. Of course, any combination of these items may be present. In other examples, "at least one of" may be, for example, without limitation, two of item A, one of item B, and ten of item C; four of item B and seven of item C; or other suitable combinations.

Figure 2:
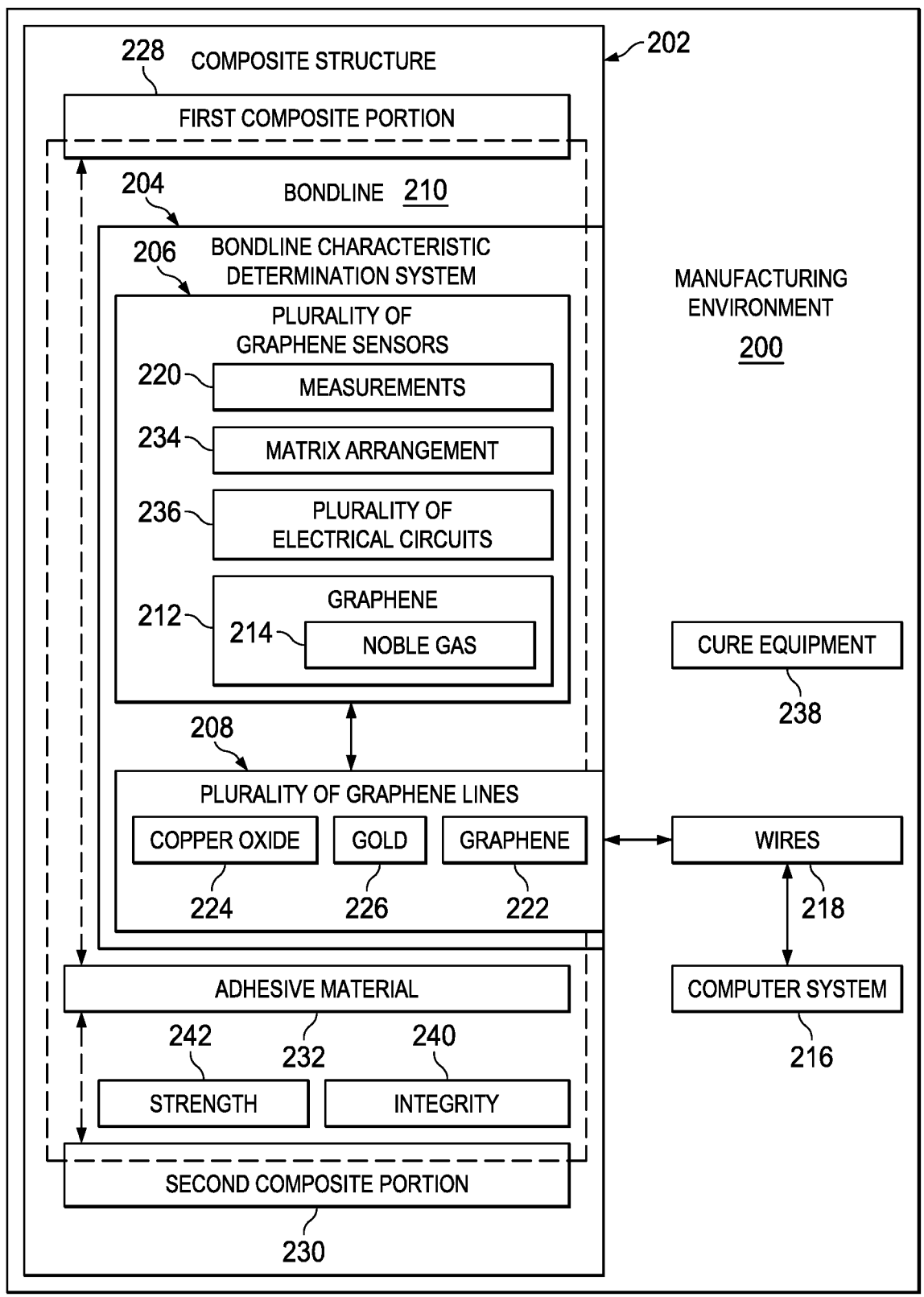
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Components of aircraft 100 of FIG. 1 may be formed in manufacturing environment 200. For example, composite structure 202 may be a portion of one of wing 102, wing 104, or body 106 of FIG. 1 of aircraft 100.

Bondline characteristic determination system 204 is present in manufacturing environment 200. Bondline characteristic determination system 204 comprises plurality of graphene sensors 206 and plurality of graphene lines 208. Plurality of graphene sensors 206 is positioned within bondline 210 of composite structure 202. Plurality of graphene sensors 206 is formed of graphene 212 doped with noble gas 214.

Plurality of graphene lines 208 electrically connects plurality of graphene sensors 206 external to composite structure 202. Plurality of graphene lines 208 extend to the exterior of composite structure 202. Any desirable type of connectors may connect plurality of graphene lines 208 to computer system 216.

As depicted, wires 218 are soldered to plurality of graphene lines 208. Wires 218 connect plurality of graphene lines 208 to computer system 216. Computer system 216 receives measurements 220 of plurality of graphene sensors 206 using plurality of graphene lines 208 and wires 218.

Plurality of graphene lines 208 is formed of graphene 222. Graphene 222 is naturally conductive. In some illustrative examples, plurality of graphene lines 208 relies on the natural conductivity of graphene 222 to connect plurality of graphene sensors 206 to computer system 216.

In some illustrative examples, plurality of graphene lines 208 includes material to increase conductivity of graphene 222 in plurality of graphene lines 208. In some illustrative examples, plurality of graphene lines 208 comprises graphene 222 doped with at least one of copper oxide 224 or gold 226. In these illustrative examples, at least one of copper oxide 224 or gold 226 increases the conductivity of graphene 222. Although not depicted, in some illustrative examples, graphene 222 may also be doped with a noble gas.

Plurality of graphene sensors 206 and plurality of graphene lines 208 is positioned in bondline 210 of composite structure 202. Bondline 210 comprises first composite portion 228 of composite structure 202, second composite portion 230 of composite structure 202, and adhesive material 232 between first composite portion 228 and second composite portion 230. Plurality of graphene sensors 206 is positioned within or on one of first composite portion 228, second composite portion 230, or adhesive material 232. By doping graphene 212 with noble gas 214, adhesive material 232 or a resin of first composite portion 228 or a resin of second composite portion 230 may not undesirably interact with graphene 212.

Each of plurality of graphene sensors 206 has a thickness between 3 and 25 microns. By having the thickness between 3 and 25 microns, plurality of graphene sensors 206 does not interfere with operation of composite structure 202. For example, by having the thickness between 3 and 25 microns, plurality of graphene sensors 206 does not change the shape of composite structure 202.

Plurality of graphene sensors 206 may be positioned in any desirable density, shape, or at any position within bondline 210. In some illustrative examples, plurality of graphene sensors 206 is positioned in matrix arrangement 234 within bondline 210.

Plurality of graphene sensors 206 includes any desirable type of sensors. In some illustrative examples, plurality of graphene sensors 206 comprises at least one of strain sensors or temperature sensors. In some illustrative examples, plurality of graphene sensors 206 is a plurality of Bridge resistor type sensors.

Any desirable method may be used to position plurality of graphene sensors 206 in bondline 210. In some illustrative examples, plurality of graphene sensors 206 may be integrated in bondline 210 via vapor deposition or embedded during composite tape lay-up. In some illustrative examples, plurality of graphene sensors 206 is positioned in bondline 210 by depositing graphene 212 onto at least one of first composite portion 228 of composite structure 202, second composite portion 230 of composite structure 202, or adhesive material 232 between first composite portion 228 and second composite portion 230 to form plurality of electrical circuits 236. In these illustrative examples, plurality of electrical circuits 236 is plurality of graphene sensors 206.

In other illustrative examples, plurality of electrical circuits 236 is a plurality of pre-formed electrical circuits made from graphene 212. In these illustrative examples, the plurality of pre-formed electrical circuits made from graphene 212 is adhered onto at least one of first composite portion 228 of composite structure 202, second composite portion 230 of composite structure 202, or adhesive material 232 between first composite portion 228 and second composite portion 230, wherein the plurality of pre-formed electrical circuits is plurality of graphene sensors 206.

Measurements 220 are taken during curing of composite structure 202 using cure equipment 238. Measurements 220 include at least one of temperature, pressure, or strain. In some illustrative examples, integrity 240 of bondline 210 of composite structure 202 is determined using measurements 220 from plurality of graphene sensors 206. In some illustrative examples, measurements 220 include temperature measurements, and integrity 240 is determined by comparing the temperature measurements to a number of desired temperatures for the curing of composite structure 202. In some illustrative examples, integrity 240 is determined by comparing both the temperature measurements and pressure measurements of measurements 220 to a number of desired temperatures and a number of desired pressures for curing composite structure 202.

In some illustrative examples, strength 242 of bondline 210 of composite structure 202 is determined using measurements 220 from plurality of graphene sensors 206. For example, measurements 220 are used to calculate strength 242 of bondline 210 by correlating measurements 220 to historical data of other composite structures having at least one of the same material or the same design as composite structure 202.

The illustration of manufacturing environment 200 in FIG. 2 is not meant to imply physical or architectural limitations to the manner in which an illustrative embodiment may be implemented. Other components in addition to, or in place of, the ones illustrated may be used. Some components may be unnecessary. Also, the blocks are presented to illustrate some functional components. One or more of these blocks may be combined, divided, or combined and divided into different blocks when implemented in an illustrative embodiment.

For example, computer system 216 may be connected to plurality of graphene lines 208 using elements other than wires 218. As another example, bondline characteristic determination system 204 may be used in conjunction with a different type of equipment other than cure equipment 238. Bondline characteristic determination system 204 may be used in any manufacturing process where temperature, pressure, or strain affects bondline 210 of composite structure 202.

Figure 3:
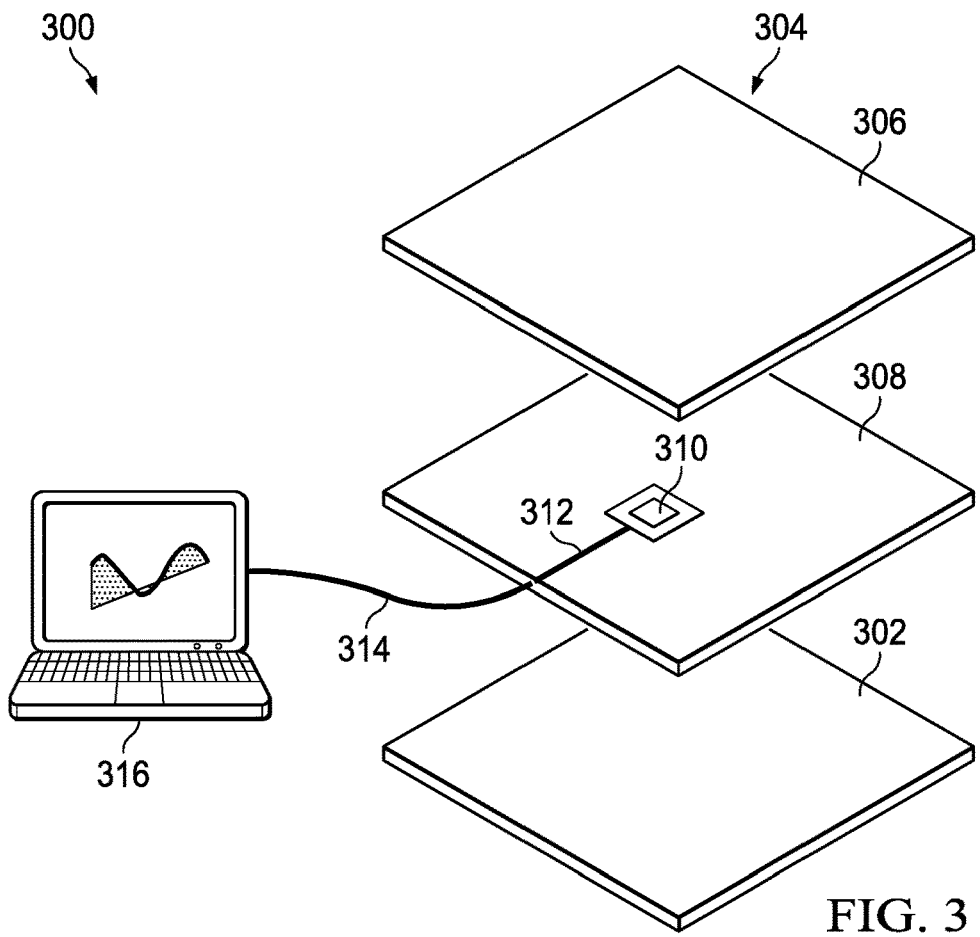
FIG. 3 is an illustration of an exploded view of a bondline of a composite structure in accordance with an illustrative embodiment.

Turning now to FIG. 3, an illustration of an exploded view of a bondline of a composite structure is depicted in accordance with an illustrative embodiment. Bondline 300 is a physical implementation of bondline 210 of FIG. 2. Bondline 300 may be a bondline for a composite structure of aircraft 100 of FIG. 1.

Bondline 300 includes first composite portion 302 of composite structure 304, second composite portion 306 of composite structure 304, and adhesive material 308 between first composite portion 302 and second composite portion 306.

Bondline 300 is depicted prior to curing of composite structure 304. Following the curing of composite structure 304, graphene sensor 310 may be subsumed by composite structure 304. For example, graphene sensor 310 will dissipate once the curing of composite structure 304 is completed.

Graphene sensor 310 is a physical implementation of one of plurality of graphene sensors 206 of FIG. 2. Graphene sensor 310 has a substantially small thickness such that graphene sensor 310 will affect the performance of composite structure 304. In some illustrative examples, graphene sensor 310 has a thickness between 3 and 25 microns. Graphene sensor 310 may have any desirable footprint.

Graphene sensor 310 may be only one of a plurality of graphene sensors that may be present in bondline 300. Other graphene sensors are not depicted only for clarity. Although graphene sensor 310 is depicted as positioned on adhesive material 308, graphene sensor 310 may be positioned on or within any of first composite portion 302, second composite portion 306, or adhesive material 308.

Graphene line 312 and wire 314 connect graphene sensor 310 to computer 316. Graphene line 312 is present in bondline 300. Graphene line 312 may be a physical implementation of one of plurality of graphene lines 208 of FIG. 2. Wire 314 is soldered or otherwise conductively connected to graphene line 312.

Computer 316 receives measurements from graphene sensor 310 through graphene line 312 and wire 314. The measurements are taken during the curing of composite structure 304. The measurements include any of temperature, pressure, or strain.

After curing of composite structure 304, composite structure 304 is trimmed. During trimming, any portions of graphene line 312 for connecting to wire 314 remaining after curing is trimmed.

Figure 4:
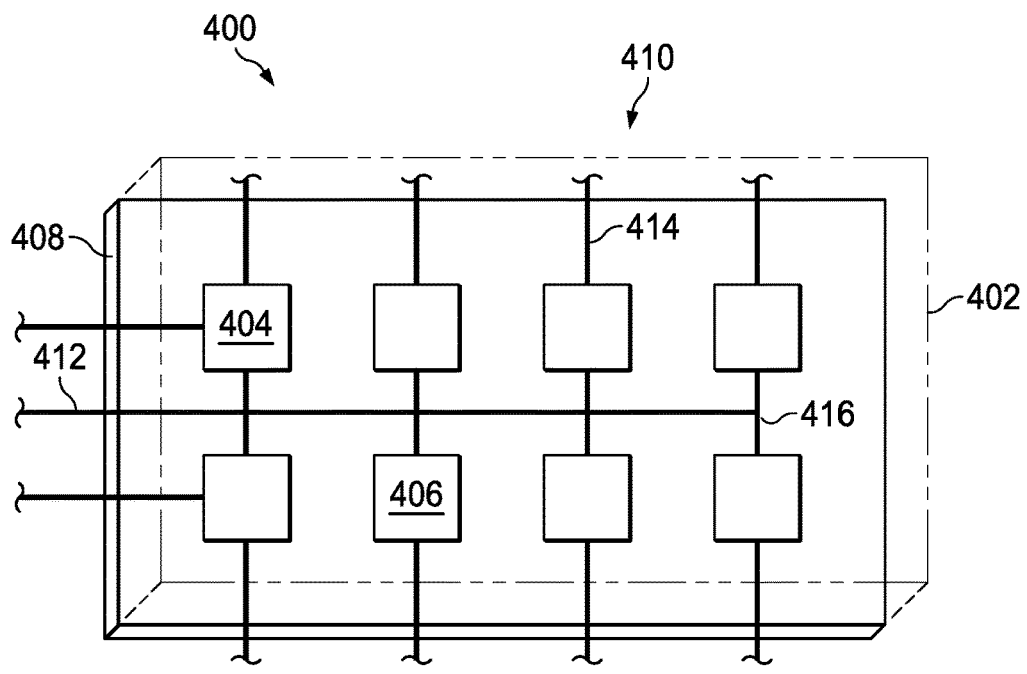
FIG. 4 is an illustration of a plurality of graphene sensors in a bondline of a composite structure in accordance with an illustrative embodiment.

Turning now to FIG. 4, an illustration of a plurality of graphene sensors in a bondline of a composite structure is depicted in accordance with an illustrative embodiment. In view 400, first composite portion 402 is displayed as transparent so that plurality of graphene sensors 404 is visible. Plurality of graphene sensors 404 is a physical implementation of plurality of graphene sensors 206 of FIG. 2.

As depicted, plurality of graphene sensors 404 is arranged into matrix arrangement 406 in bondline 408. Characteristics such as at least one of density, spacing, or positioning of plurality of graphene sensors 404 in matrix arrangement 406 may be selected based on at least one of performance characteristics, design, or material of composite structure 410.

In some illustrative examples, each of plurality of graphene sensors 404 is the same design of sensors. In other illustrative examples, plurality of graphene sensors 404 includes at least two different designs of sensors.

In some illustrative examples, plurality of graphene sensors 404 takes the same type of measurements. In some illustrative examples, plurality of graphene sensors 404 takes more than one type of measurement. In some illustrative examples, at least one of plurality of graphene sensors 404 takes more than one type of measurement.

Plurality of graphene lines 412 connects plurality of graphene sensors 404 external to composite structure 410. Each graphene sensor of plurality of graphene sensors 404 is individually read. As depicted, each graphene sensor of plurality of graphene sensors 404 is connected to a respective positive source. Thus, graphene lines 414 of plurality of graphene lines 412 only provide a positive source to a single sensor of plurality of graphene sensors 404.

As depicted, some of plurality of graphene lines 412 connect plurality of graphene sensors 404 to each other. As depicted, graphene lines 416 of plurality of graphene lines 412 deliver a common negative source to plurality of graphene sensors 404. By supplying a common negative source to plurality of graphene sensors 404, equipment, such as external wires to composite structure 410 may be reduced.

The illustrations of matrix arrangement 406 and plurality of graphene lines 412 in FIG. 4 are not meant to imply physical or architectural limitations to the manner in which an illustrative embodiment may be implemented. Matrix arrangement 406 may include any desirable quantity of graphene sensors or arrangement of plurality of graphene sensors 404. Plurality of graphene lines 412 may have any desirable quantity or location based on at least one of manufacturability, desired connections between plurality of graphene sensors 404, or manufacturing costs. For example, instead of a common negative source, in some illustrative examples, at least one of plurality of graphene sensors 404 may have a graphene line supplying a negative source only to the one sensor.

Figure 5:
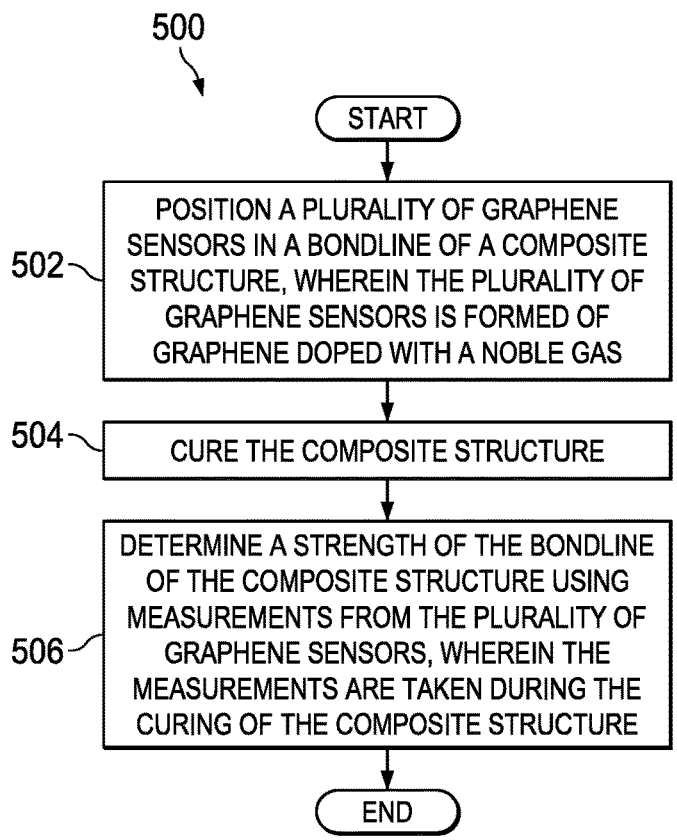
FIG. 5 is an illustration of a flowchart of a method for determining a strength of a bondline of a composite structure in accordance with an illustrative embodiment.

Turning now to FIG. 5, an illustration of a flowchart of a method for determining a strength of a bondline of a composite structure is depicted in accordance with an illustrative embodiment. Method 500 may be used to determine a strength of a bondline of a composite structure in aircraft 100 of FIG. 1. Method 500 may use plurality of graphene sensors 206 to determine strength 242 of bondline 210 of composite structure 202 of FIG. 2. Method 500 may be implemented using graphene sensor 310 to determine the strength of bondline 300 of composite structure 304 of FIG. 3. Method 500 may be implemented using plurality of graphene sensors 404 of FIG. 4.

Method 500 positions a plurality of graphene sensors in a bondline of a composite structure, wherein the plurality of graphene sensors is formed of graphene doped with a noble gas (operation 502). The plurality of graphene sensors may be positioned in any desirable manner. In some illustrative examples, positioning the plurality of graphene sensors in the bondline of the composite structure comprises depositing graphene onto at least one of a first composite portion of the composite structure, a second composite portion of the composite structure, or an adhesive material between the first composite portion and the second composite portion to form a plurality of electrical circuits, wherein the plurality of electrical circuits is the plurality of graphene sensors. In some illustrative examples, positioning the plurality of graphene sensors in the bondline of the composite structure comprises adhering a plurality of pre-formed electrical circuits made from the graphene onto at least one of the first composite portion of the composite structure, the second composite portion of the composite structure, or the adhesive material between the first composite portion and the second composite portion, wherein the plurality of the pre-formed electrical circuits is the plurality of graphene sensors.

The plurality of graphene sensors may take any desirable form and any desirable arrangement. In some illustrative examples, the plurality of graphene sensors comprises at least one of strain sensors or temperature sensors. In some illustrative examples, each of the plurality of graphene sensors has a thickness between 3 and 25 microns. In some illustrative examples, the plurality of graphene sensors is positioned into a matrix arrangement in the bondline.

In some illustrative examples, the bondline comprises the first composite portion of the composite structure, the second composite portion of the composite structure, and the adhesive material between the first composite portion and the second composite portion. The plurality of graphene sensors is positioned within or on one of the first composite portion, the second composite portion, or the adhesive material.

Method 500 cures the composite structure (operation 504). In some illustrative examples, the plurality of graphene sensors is subsumed into the bondline when the composite structure is cured. The plurality of graphene sensors may not be useable following curing of the composite structure.

Method 500 determines a strength of the bondline of the composite structure using measurements from the plurality of graphene sensors, wherein the measurements are taken during the curing of the composite structure (operation 506). Afterwards, the method terminates.

Figure 6:
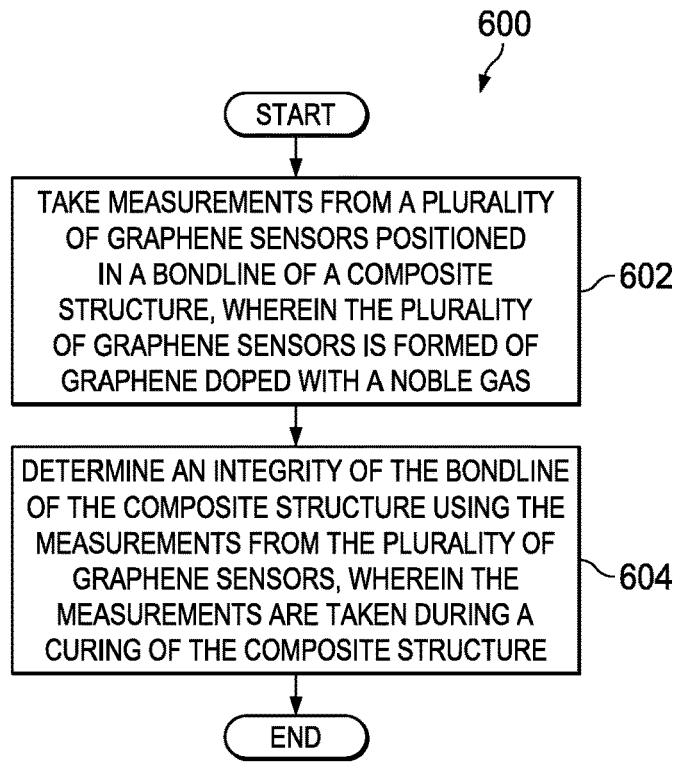
FIG. 6 is an illustration of a flowchart of a method for determining an integrity of a bondline of a composite structure in accordance with an illustrative embodiment.

Turning now to FIG. 6, an illustration of a flowchart of a method for determining an integrity of a bondline of a composite structure is depicted in accordance with an illustrative embodiment. Method 600 may be used to determine an integrity of a bondline of a composite structure in aircraft 100. Method 600 may use plurality of graphene sensors 206 to determine integrity 240 of bondline 210 of composite structure 202 of FIG. 2. Method 600 may be implemented using graphene sensor 310 to determine an integrity of bondline 300 of composite structure 304 of FIG. 3. Method 600 may be implemented using plurality of graphene sensors 404 of FIG. 4.

Method 600 takes measurements from a plurality of graphene sensors positioned in a bondline of a composite structure, wherein the plurality of graphene sensors is formed of graphene doped with a noble gas (operation 602). Method 600 determines an integrity of the bondline of the composite structure using the measurements from the plurality of graphene sensors, wherein the measurements are taken during a curing of the composite structure (operation 604). Afterwards, the method terminates.

In some illustrative examples, determining the integrity of the composite structure comprises determining a strength of the composite structure using the measurements, and comparing the strength to a strength threshold. In some illustrative examples, the measurements include temperature measurements, and determining the integrity of the composite structure comprises comparing the temperature measurements to a number of desired temperatures for curing the composite structure.

The flowcharts and block diagrams in the different depicted illustrative embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the Figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. In some illustrative examples, method 500 of FIG. 5 further comprises positioning a plurality of graphene lines in the bondline to electrically connect the graphene sensors to a computer system, wherein the graphene lines comprise graphene doped with a metallic material.

The illustrative examples describe a flexible lightweight graphene bond strength system. The illustrative examples describe flexible, very thin, light weight, embedded bond strength sensors effective for many types of composite manufacture testing. The sensors are placed in a composite area of interest to determine the integrity and the strength of the composite. By using the graphene sensors in situ, resulting integrity and strength of the composite may be changed by changing processing based on in situ measurements from the graphene sensors.

The illustrative examples describe a use of a graphene bond strength system in the manufacturing and testing of composite structures. The illustrative examples may allow for FAA approval of using bonded composite structures. Approval of using bonded composite structure may result in significant cost savings in airplane manufacturing by eliminating fasteners.

The illustrative examples describe the use of a bondline characteristic determination system to determine the strength or the integrity of the composite structures. By determining the strength or the integrity of the composite structures, manufacturing waste may be reduced. More specifically, manufacturing waste due to processing the composite structures with unacceptable inconsistencies may be reduced by identifying the unacceptable inconsistencies earlier than conventional methods. Further, by monitoring the curing of a composite structure using the bondline characteristic determination system, a curing process may be modified using the measurements of the graphene sensors in the bondline to produce a composite structure with an acceptable strength. By modifying the curing process in situ, scrap may be reduced.

Since the graphene sensors are so small, they can remain in the bondline for the rest of the structure life without any impact to the performance of the structure. Graphene thermal resistors are extremely durable in high temperature environments. Lightweight, small footprint, graphene bond measurement systems can be placed throughout the carbon fiber reinforced composite resin in a matrix network configuration while in the mold or during testing, and monitored throughout the entire manufacturing or testing process to produce a high strength composite structure with an acceptable level of inconsistencies The illustrative examples use the change in electrical resistivity of graphene as a function of temperature to allow for the development of a graphene bond strength measuring device that is non-structural and unobtrusive and with its electrical-thermal characteristics ideal for accurately controlling the heating in complex composite structures. By knowing the curing residual strength and a temperature, we can determine the bond integrity both during curing and after curing.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
   positioning a plurality of graphene sensors in a bondline of a composite structure, wherein the plurality of graphene sensors is formed of graphene doped with a noble gas;
   curing the composite structure; and
   determining a strength of the bondline of the composite structure using measurements from the plurality of graphene sensors, wherein the measurements are taken during the curing of the composite structure.

2. The method of claim 1, wherein positioning the plurality of graphene sensors comprises:
   positioning the plurality of graphene sensors into a matrix arrangement in the bondline.

3. The method of claim 1, wherein positioning the plurality of graphene sensors comprises:
   depositing graphene onto at least one of a first composite portion of the composite structure, a second composite portion of the composite structure, or an adhesive material between the first composite portion and the second composite portion to form a plurality of electrical circuits, wherein the plurality of electrical circuits is the plurality of graphene sensors.

4. The method of claim 1, wherein positioning the plurality of graphene sensors comprises:
   adhering a plurality of pre-formed electrical circuits made from graphene onto at least one of a first composite portion of the composite structure, a second composite portion of the composite structure, or an adhesive material between the first composite portion and the second composite portion, wherein the plurality of pre-formed electrical circuits is the plurality of graphene sensors.

5. The method of claim 1 further comprising:
positioning a plurality of graphene lines in the bondline to electrically connect the plurality of graphene sensors to a computer system.

6. The method of claim 5, wherein the plurality of graphene lines comprise graphene doped with a metallic material.

7. The method of claim 1, wherein the plurality of graphene sensors comprises at least one of strain sensors or temperature sensors.

8. The method of claim 1, wherein the bondline comprises a first composite portion of the composite structure, a second composite portion of the composite structure, and an adhesive material between the first composite portion and the second composite portion.

9. The method of claim 1, wherein the plurality of graphene sensors is subsumed into the bondline when the composite structure is cured, by the graphene sensor dissipating into the composite structure.

10. The method of claim 1, wherein each of the plurality of graphene sensors has a thickness between 3 and 25 microns.

11. A method comprising:
taking measurements from a plurality of graphene sensors positioned in a bondline of a composite structure, wherein the plurality of graphene sensors is formed of graphene doped with a noble gas; and
determining an integrity of the bondline of the composite structure using the measurements from the plurality of graphene sensors, wherein the measurements are taken during a curing of the composite structure.

12. The method of claim 11, wherein determining the integrity of the composite structure comprises:
determining a strength of the composite structure using the measurements; and
comparing the strength to a strength threshold.

13. The method of claim 11, wherein the measurements include temperature measurements, and wherein determining the integrity of the composite structure comprises comparing the temperature measurements to a number of desired temperatures for curing the composite structure, and correlating the measurements to historical data of other composite structures having at least one of the same material or the same design as the composite structure.

14. A bondline characteristic determination system comprising:

a plurality of graphene sensors positioned within a bondline of a composite structure, wherein the plurality of graphene sensors is formed of graphene doped with a noble gas; and
a plurality of graphene lines electrically connecting the plurality of graphene sensors external to the composite structure.

15. The bondline characteristic determination system of claim 14 further comprising:
wires soldered to the plurality of graphene lines.

16. The method of claim 1, wherein the plurality of graphene sensors are Bridge resistor type sensors.

17. The method of claim 6, wherein the plurality of graphene lines comprises graphene doped with at least one of copper oxide or gold.

18. The method of claim 5 further comprising:
soldering wires to the plurality of graphene lines to connect the plurality of graphene sensors to the computer.

19. The method of claim 11 further comprising:
receiving the measurements of the plurality of graphene sensors from a plurality of graphene lines electrically connecting the plurality of graphene sensors external to the composite structure.

20. The method of claim 1, wherein the strength is determined by correlating the measurements to historical data of other composite structures having at least one of the same material or the same design as the composite structure.

21. The bondline characteristic determination system of claim 14, wherein the plurality of graphene lines comprises graphene doped with at least one of copper oxide or gold.

22. The bondline characteristic determination system of claim 14, wherein each of the plurality of graphene sensors has a thickness between 3 and 25 microns.

23. The bondline characteristic determination system of claim 14, wherein the plurality of graphene sensors is positioned in a matrix arrangement within the bondline.

24. The bondline characteristic determination system of claim 14, wherein the bondline comprises a first composite portion of the composite structure, a second composite portion of the composite structure, and an adhesive material between the first composite portion and the second composite portion, and wherein the plurality of graphene sensors is positioned within or on one of the first composite portion, the second composite portion, or the adhesive material.

25. The bondline characteristic determination system of claim 14, wherein the plurality of graphene sensors are Bridge resistor type sensors.

* * * * *